United States Patent [19]

Siebert

[11] Patent Number: 5,131,323

[45] Date of Patent: Jul. 21, 1992

[54] PACKING SHEET CALENDER

[76] Inventor: Hermann Siebert, Rendaer Strasse 13, D 6443 Sontra-Ulfen, Fed. Rep. of Germany

[21] Appl. No.: 815,535

[22] Filed: Dec. 24, 1991

Related U.S. Application Data

[63] Continuation of Ser. No. 496,277, Mar. 20, 1990, abandoned.

[30] Foreign Application Priority Data

Mar. 20, 1989 [DE] Fed. Rep. of Germany ....... 3909134

[51] Int. Cl.⁵ .......................... B30B 15/34; B30B 3/04
[52] U.S. Cl. ............................ 100/93 RP; 100/155 R; 165/89
[58] Field of Search ...................... 100/93 RP, 155 R; 165/86, 89, 90

[56] References Cited

U.S. PATENT DOCUMENTS

| | | | |
|---|---|---|---|
| 1,751,116 | 3/1930 | Welton | 100/93 RP X |
| 2,936,158 | 5/1960 | Ramundo | 165/89 |
| 3,135,319 | 6/1964 | Richards | 100/93 RP X |
| 3,208,513 | 9/1965 | Pendleton | 165/90 |
| 3,887,250 | 6/1975 | Fleissner | 165/89 X |
| 4,050,510 | 9/1977 | Theysohn | 165/89 |
| 4,252,184 | 2/1981 | Appel | 165/89 X |
| 4,351,386 | 9/1982 | Köbler | 165/89 |
| 4,757,582 | 7/1988 | Verkasalo | 100/93 RP X |

FOREIGN PATENT DOCUMENTS

| | | |
|---|---|---|
| 412658 | 4/1925 | Fed. Rep. of Germany ........ 165/90 |
| 587808 | 11/1933 | Fed. Rep. of Germany ........ 165/89 |
| 838856 | 5/1952 | Fed. Rep. of Germany . |
| 2315669 | 10/1974 | Fed. Rep. of Germany . |
| 2321367 | 10/1974 | Fed. Rep. of Germany . |
| 2731272 | 1/1978 | Fed. Rep. of Germany ... 100/93 RP |

Primary Examiner—Harvey G. Hornsby
Assistant Examiner—Stephen F. Gerrity
Attorney, Agent, or Firm—Robert E. Burns; Emmanuel J. Lobato

[57] ABSTRACT

A packing sheet calender comprises a cooled cylinder of small diameter and a heated cylinder of large diameter. The heated cylinder comprises a cylindrical casing and end walls with integral stub shafts projecting centrally from the end walls. At least one of the stub shafts is hollow. Circumferentially spaced axially extending bores are provided in the casing for the flow of hot water which is supplied by a tube system extending axially of the cylinder and comprising an inner tube and an outer tube surrounding the inner tube. Radial bores in one end wall connect the axially extending bores in the casing with the outer tube. Radial bores in the other end wall connect the axially extending bores in the casing with an annular chamber which is connected with the inner tube. The inner and outer tubes are connected through the hollow stub shaft with a device for supplying hot water to one of the tubes and withdrawing water from the other.

11 Claims, 4 Drawing Sheets

PACKING SHEET CALENDER

This is a continuation of application Ser. No. 07/496,277, filed Mar. 20, 1990 now abandoned.

FIELD OF THE INVENTION

The invention relates to a packing sheet calender comprising a cooled cylinder of small diameter and a heated cylinder of large diameter which is composed of a cylindrical casing and two ends with a stub shaft projecting centrally from each end, at least one of the stub shafts being hollow for the supply and/or discharge of a heating medium.

BACKGROUND OF THE INVENTION

Such calenders for the production of fiber reinforced rubber packing sheets have been built for many years. In such calenders, the heated cylinder, on account of its large diameter of at least 1,000 mm. or more, is made hollow and serves simultaneously as the steam drum for heating of the outer surface of the cylinder. The steam is admitted through the central bore of one of the stub shafts and the condensate is again discharged through a tube extending centrally in the stub shaft.

The heating with steam has serious disadvantages. For one thing these cylinders must meet special structural requirements in order to comply with testing regulations. On the other hand, the surface temperature of such steam drums cannot be regulated fast enough or precise enough for present day technological processes.

Hence it was proposed about fifteen years ago in DE-AS 23 21 367 to heat the hot cylinder of a packing sheet calender with hot water which is led through bores in the casing of the hot cylinder parallel to its axis. For this purpose, the hot cylinder has a hollow through shaft from which radial channels in the ends of the cylinder extend to the axis-parallel bores in the casing. However, this proposal has never been realized because its construction encountered insuperable difficulties. These difficulties arose on the one hand in the creation of a mechanically tight connection between the shaft and the cylinder end and on the other hand in sealing difficulties. The very massively constructed cylinder casing, on the ground of stability, has a considerable weight, which on rapid braking of the shaft leads to a considerable torsional moment where the end of the cylinder is connected with the shaft. As in these same places radial channels extend out from the hollow shaft in the cylinder ends, there are insurmountable construction difficulties in these cases in obtaining a sufficiently stable connection of the cylinder ends on the hollow shaft. Moreover, at these same places there are also sealing difficulties because a spatially very close arrangement of the radial channels is required, of which the one supplies water to the axis-parallel channels of the casing and the other discharges the water. Thus on each end supply channels and also discharge channels are arranged, if the outer surface of the cylinder is to be uniformly heated, for example through a heating channel arrangement as shown in DE-PS 23 15 669.

The hot cylinders of packing sheet calenders cannot be made of solid material, because their mass would be so great that they could not be braked fast enough in case of emergency or also for an economical production operation, the high braking forces and the weight of the cylinder rendering the device technically uninteresting. Hence a radial channel arrangement according to DE-PS 23 15 669 is no more possible than a cylinder construction according to U.S. Pat. No. 2,936,158, in which a massive cylinder with recesses in its outer surface is surrounded by a schrunk-on cylindrical casing. This construction form is also prohibited on account of the unequal heating of the casing surface because here in the region of one end of the cylinder the heating medium enters while at the other end the heating medium is exhausted.

On the other hand, the hot cylinder of a packing sheet calender is not so easily constructed as in DE-PS 838 856 for the drying cylinder of a paper machine because the pressing forces on the outer face of the cylinder in a packing sheet calender are far greater and the cylinder casing requires a high hardness and resistance to wear.

SUMMARY OF THE INVENTION

The invention eliminates the disadvantages of the state of the art. It is the object of the invention, with simple means to make possible a heating of axis-parallel bores in the cylinder casing of the hot cylinder, without imparing the strength of the construction of the hot cylinder so that a rapid and effective heating of the hot cylinder can be obtained simultaneously with outstanding adjustability.

The invention consists therein that, departing from the aforementioned hot cylinder construction, there is provided in the interior of the heated cylinder a tube system for the inflow and outflow of hot water extending between the two ends of the cylinder, from which channels branch off and lead to bores arranged in the casing of the hot cylinder which serve as hot water channels.

This hot cylinder of a packing sheet calender is characterized by the same stability and strength as the hot cylinder previously constructed as a steam drum. For the two ends are formed integrally with the shaft journals. Hence the transition from the shaft journals to the ends of the cylinder exhibit the greatest possible stability. At the same time, however, with the stability remaining constant, the weight of the hot cylinder is reduced because through the axial bores in the casing and the radial bores in the ends of the cylinder there is less mass than in the known hot cylinder constructed as a steam drum and, on the other hand, through the absence of the shaft parts present in the interior of the hot cylinder of DE-PS 23 21 367 a considerable reduction in weight is also attained. Besides, while retaining the desired stability, hot water can be used as the heating medium which brings heat into the hot cylinder and thereby makes possible a more rapid and effective regulation.

It is advantageous when one stub shaft is hollow and the tube system for the hot water extends through the hollow stub shaft. With such a tube system, sealing problems can be solved more simply.

There is also the possibility, that both stub shafts are hollow with the hot water supply extending through one stub shaft and the hot water discharge extending through the other stub shaft.

It is advantageous when the channels are formed by radial bores in the cylinder end wall. However, the channels can also be formed as tubes laid alongside the end walls of the cylinder.

For further reducing the weight of the cylinder, it is advantageous when the end walls have openings between which spokes are disposed.

The sealing problems can be solved more simply when sealing surfaces or conical sealing surfaces are arranged on the peripheries of the terminals of the tube system.

Thus it is advantageous when the tube system comprises two concentrically arranged tubes and at least a third tube piece which concentrically surrounds the outer tube and which is connected with the inner tube through a channel. In this manner, to and fro flow of the hot water can be realized on each face which is necessary for uniform heating of the cylinder surface.

BRIEF DESCRIPTION OF THE DRAWINGS

The invention will be more fully understood from the following description of a preferred embodiment shown by way of example in the accompanying drawings in which.

DESCRIPTION OF PREFERRED EMBODIMENT

Figure 4:
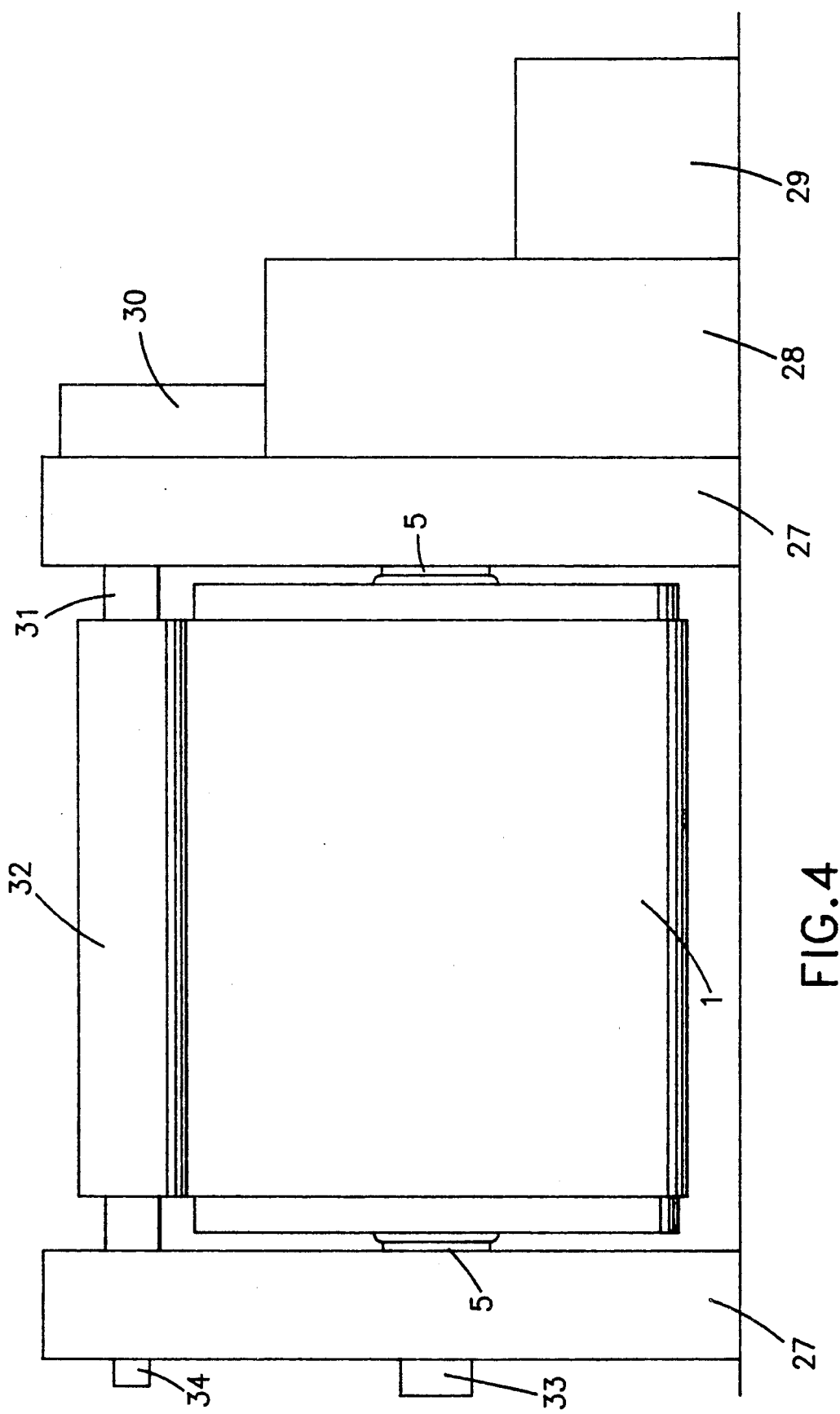

As seen in FIG. 4, the calender comprises a heated cylinder 1 having a shaft 5 and a cooled cylinder 32 having a shaft 31. The cylinders are rotatably supported by calender stands 27 and are driven by a motor in a motor housing 29 through gears in a gear housing 28 and a transmission in a transmission housing 30. The heated cylinder has a connection 33 for heated water and the cooled cylinder 32 has a connection 34 for cooling water.

The heated cylinder comprises a hollow cylindrical casing 1, which has peripheral bores 2 parallel to the axis of the cylinder. The casing is connected by screws 3 with end walls 4 which are formed integrally with shaft journals 5. These end walls 4 have radial channels 6 for supplying hot water to the bores 2 in the casing and radial channels 7 for discharging the hot water from the axially extending bores 2. These radial channels 6, 7 must be arranged in each of the two cylinder end walls. In order to reduce the weight of the calender cylinder, the end walls 4 have openings 8 between which are disposed spokes 9.

Figure 1:
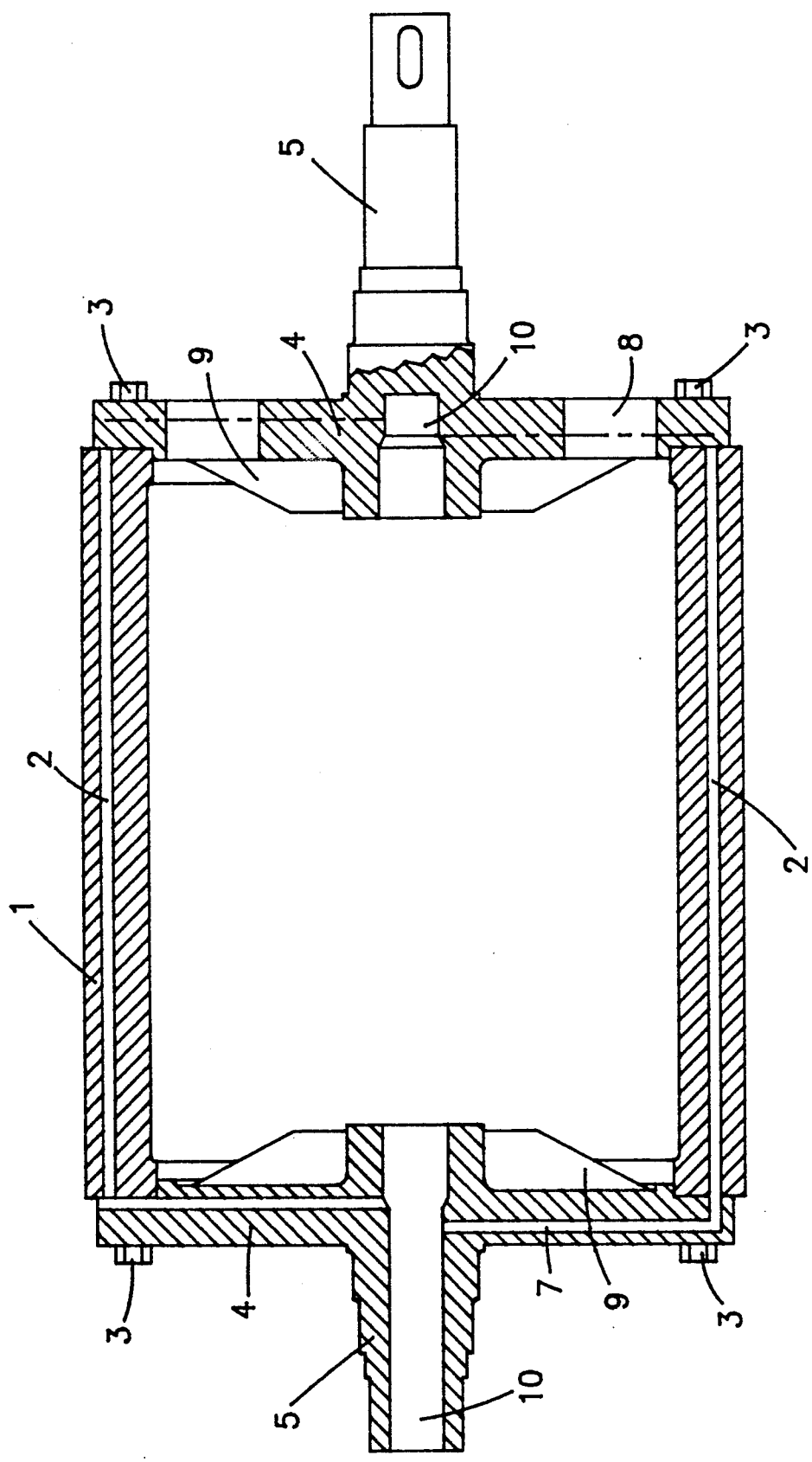
FIG. 1 is a longitudinal section of the heated cylinder.
Figure 2:
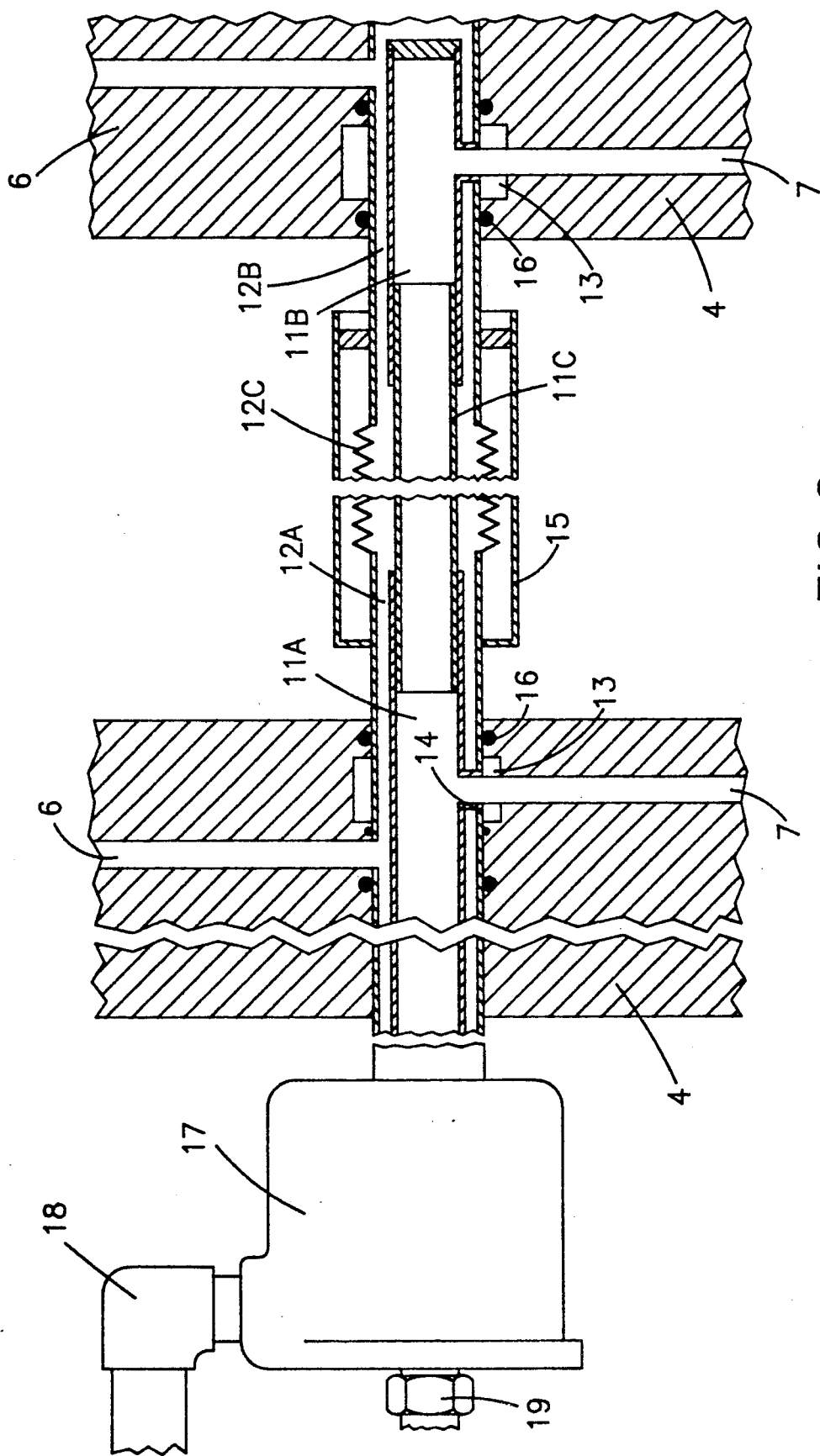
FIG. 2 is a longitudinal section of the tube system in the heated cylinder.

At least one of the shaft journals 5 has a central bore 10 through which the tube system of FIG. 2 extends or in which the tube system of FIG. 2 is inserted and extends into a blind bore 10 in the right shaft journal.

This tube system of FIG. 2 comprises a central tube 11 for the out-flow of the hot water as well as an outer tube 12, surrounding the inner tube 11 for in-flow of the hot water. From this tube 12 for in-flow of the hot water extend radial channels 6, which extend through the end wall 4 to ends of the axis-parallel bores 2 in the casing. As the channels 7 for the hot water outflow cannot be connected directly with the inner tube 11, there is provided in the bore of the end wall 4 an annular recess 13 which is connected by channel pieces 14 with the inner tube 11.

In the space between the two end walls 4, the outer tube 12 is surrounded by a casing 15. On the outer tube 12, sealing rings 16 prevent hot water out-flow or leakage. A device 17 with stationary housing, a hot water in-flow 18 and a hot water out-flow 19 provides the in-flow and out-flow in the tube system rotating with the hot cylinder.

In the casing 15 there are means for absorbing thermal expansion, namely for the outer tube 12 a bellows tube 12C which connects a part 12A of the outer tube with the other part 12B of the outer tube as well as in the tube sections 11A and 11B a slidable tube section 11C which connects the two tube sections 11A, 11B with one another and through its tight bearing in these two tube sections permits thermal expansion.

Figure 3:
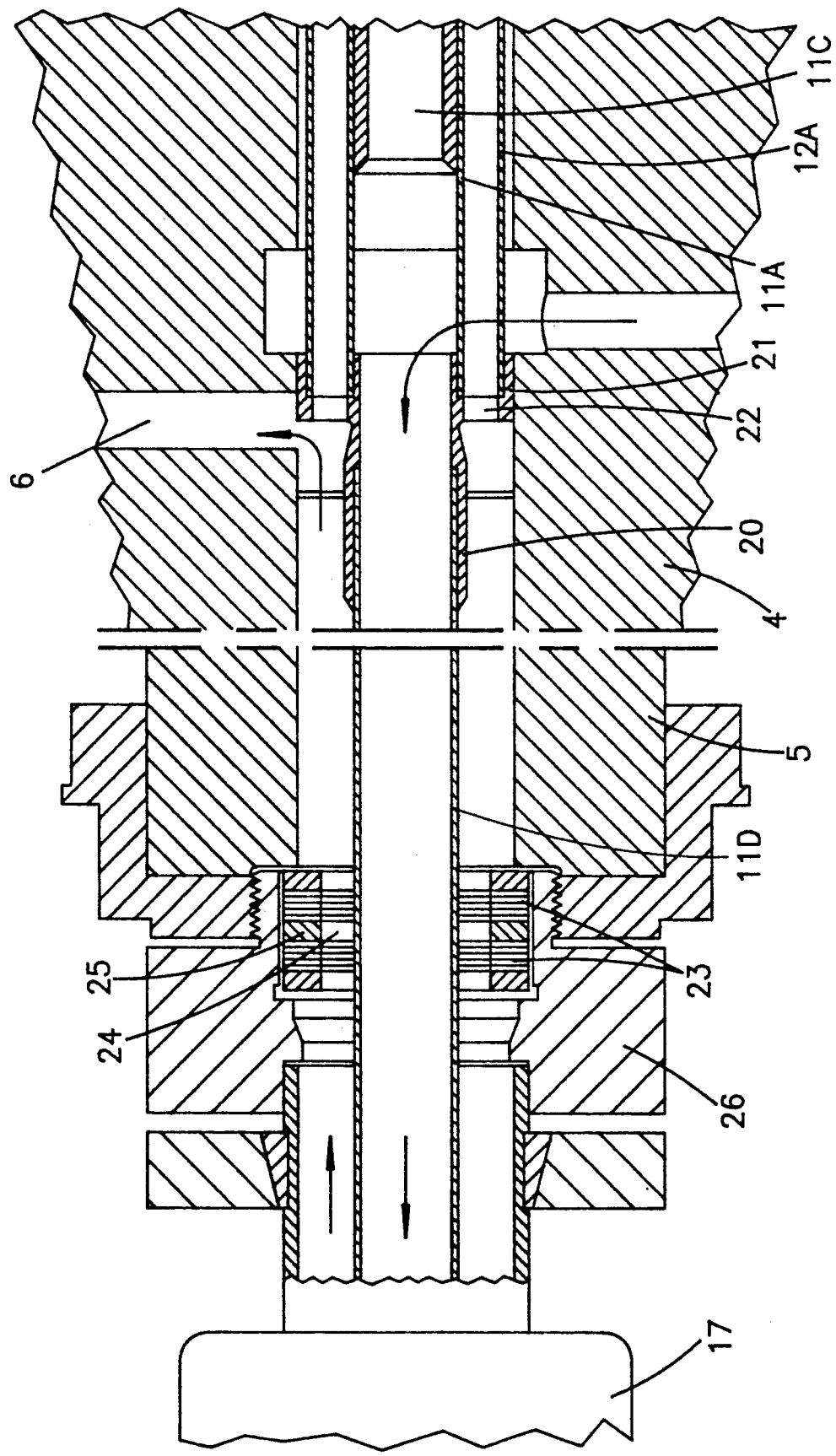
FIG. 3 is a longitudinal section on a larger scale of the connections of the tube system of the heated cylinder and FIG. 4 is a schematic elevation of the calender.

As seen in FIG. 3, the outer tube 12 does not extend out of the hot cylinder but rather the end turned toward the hot water supply and discharge device 17 bears in a bearing part 20 which is in the form of a socket 20 which forms a holder for the inner tube 11A, the outer tube 12A and the tube section 11D which forms an extension of the tube 11 leading to the hot water supply and discharge device 17. This tube section 11D is provided with an outer thread which screws into the inner thread of the socket 20, and an outer thread of which the tube section 11A is screwed. This socket part 20 is surrounded by a ring 21 which is produced integrally with the socket part 20 and has an inner thread in which the tube 12A is screwed and openings 22 through which the hot water in the space between the tubes 11A and 12A flows in order to lead to the end wall 4 which is opposite to the supply and discharge device 17. However, this socket part with its outer ring 21 also serves to regulate the amount of hot water flowing in the channels 6 since this ring 21 partially covers the inner ends of the channels 6. This regulation is effected by means of spacing washers 23 which surround the tube section 11D on opposite sides of the ring 25 provided with openings 24. These spacing washers are pressed on the end wall 4, or journal 5 connected with the end wall, through a screw collar 26. Through changing the spacing washers from the left side of the ring 25 to the right side of the ring or visa versa, the distance of the socket part 20 with its ring 21 relative to the end of the journal 5 can be altered and thus the extent to which the outer circumference of the ring 21 covers the channels 6 can be varied. Thus the inflow of hot water into the channels 6 can be regulated.

I claim:

1. A packing sheet calender comprising a cooled cylinder of small diameter and a heated cylinder of large diameter, said heated cylinder comprising a hollow cylindrical casing and two end walls with integral stub shafts projecting centrally from said end walls, at least one of said stub shafts being hollow, said casing having therein circumferentially spaced, axially extending passages for the flow of hot water, means adjacent an external end of said hollow stub shaft for supplying hot water to and exhausting said hot water from said heated cylinder, said hot water supplying and exhausting means comprising an outlet for supplying hot water to said heated cylinder and an inlet for exhausting hot water from said cylinder, a tube system extending axially of said heated cylinder and comprising an inner tube and an outer tube surrounding said inner tube, said inner and outer tubes extending the full length of said heated cylinder, means connecting one of said tubes through said hollow stub shaft with said outlet of said hot water supplying and exhausting means and means connecting the other of said tubes through said hollow stub shaft with said inlet of said hot water supplying and exhausting means, an annular chamber surrounding said outer tube at each end of said heated cylinder and a passageway connecting each said annular chamber respectively with said inner tube, a plurality of radial extending channels at a first end of said heated cylinder connecting said respective annular chamber with ends of first ones of said axially extending passages in said casing and connecting said outer tube respectively with ends of second ones of said axially extending passages in said casing, and a plurality of radially extending channels at a second end of said heated cylinder connecting said outer tube respectively with ends of said first ones of said axially extending passages in said casing and connecting said respective annular chamber with ends of said second ones of said axially extending passages in said casing.

2. A packing sheet calender according to claim 1, in which said radially extending channels comprise radially extending bores in said end walls of said heated cylinder.

3. A packing sheet calender according to claim 1, in which said end walls of said heated cylinder have therein circumferentially spaced openings with spokes between said openings.

4. A packing sheet calender according to claim 1, in which means for connecting said tubes of said tube system with said supply of hot water and hot water exhaust comprise rotary seals.

5. A packing sheet calender comprising a cooled cylinder of small diameter and a heated cylinder of large diameter, said heated cylinder comprising a cylindrical casing and two end walls with integral stub shafts projecting centrally from said end walls, at least one of said stub shafts being hollow, said casing having therein circumferentially spaced, axially extending passages for the flow of hot water, means adjacent an external end of said hollow stub shaft for supplying hot water to and exhausting said hot water from said heated cylinder, said hot water supplying and exhausting means comprising an outlet for supplying hot water to said heated cylinder and an inlet for exhausting hot water from said cylinder, a tube system extending axially of said heated cylinder and comprising an inner tube and an outer tube surrounding said inner tube, means connecting one of said tubes through said hollow stub shaft with said outlet of said hot water supplying and exhausting means and means connecting the other of said tubes through said hollow stub shaft with said inlet of said hot water supplying and exhausting means, and radial extending passages at one end of said heated cylinder connecting said inner tube with ends of axially extending passages in said casing and radially extending passages at the other end of said heated cylinder connecting said outer tube with ends of axially extending passages in said casing, the stub shaft opposite said hollow stub shaft has therein a blind bore, and in which said tubes of said tube system extend into said blind bore.

6. A packing sheet calender comprising two calender stands spaced from one another, a cooled cylinder of small diameter rotatably supported between said calender stands, a heated cylinder of large diameter disposed between said calender stands with its axis parallel to the axis of said cylinder of small diameter, said large diameter heated cylinder comprising two circular end walls and a hollow cylindrical casing, means rotatably supporting said heated cylinder of large diameter on said calender stands, said supporting means consisting of two stub shafts integral with and projecting axially from said end walls respectively, said stub shafts being rotatably supported by bearings in said calender stands respectively, at least one of said stub shafts being hollow, said casing having therein circumferentially spaced, axially extending passages for the flow of hot water, a tube system extending axially of said heated cylinder and comprising an inner tube and an outer tube surrounding said inner tube to provide a first fluid passageway in said inner tube and a second fluid passageway between said tubes, means for connecting one of said fluid passageways to a supply of hot water and means for connecting the other of said fluid passageways to a hot water exhaust, radially extending channels at a first end of said heated cylinder comprising channels connecting said first fluid passageway with first ones of said axially extending passages in said casing and channels connecting said second fluid passageway with second ones of said axially extending passages in said casing and radially extending channels at a second end of said heated cylinder comprising channels connecting said first fluid passageway with said second ones of said axially extending passages in said casing and channels connecting said second fluid passageway with said first ones of said axially extending passages in said casing, to provide flow of hot water through said axially extending passages in said casing, said inner and outer tubes of said tube system comprising means located intermediate ends of said tubes for absorbing axial thermal expansion.

7. A packing sheet calender according to claim 6 in which said means for absorbing thermal expansion comprises axially slidable tube sections.

8. A packing sheet calender according to claim 6, in which said means for absorbing thermal expansion comprises a bellows tube section.

9. A packing sheet calender according to claim 6, in which an annular casing surrounds said means for absorbing thermal expansion of said tubes.

10. A packing sheet calender comprising a cooled cylinder of small diameter and a heated cylinder of large diameter, said heated cylinder comprising a cylindrical casing and two end walls with integral stub shafts projecting centrally from said end walls, at least one of said stub shafts being hollow, said casing having therein circumferentially spaced, axially extending passages for the flow of hot water, means adjacent an external end of said hollow stub shaft for supplying hot water to and exhausting said hot water from said heated cylinder, said hot water supplying and exhausting means comprising an outlet for supplying hot water to said cylinder and an inlet for exhausting hot water from said cylinder, a tube system extending axially of said heated cylinder and comprising an inner tube and an outer tube surrounding said inner tube, means connecting one of said tubes through said hollow stub shaft with said outlet of said hot water supplying and exhausting means and means connecting the other of said tubes through said hollow stub shaft with said inlet of said hot water supplying and exhausting means, and radial extending passages at ends of said heated cylinder connecting said inner tube and said outer tube with ends of said axially extending passages in said casing, said means for connecting said tubes of said tube system with the outlet and inlet of said hot water supplying and exhausting means comprising an annular socket fitted on adjacent ends of said inner and outer tubes, with a central opening for communication with said inner tube and a plurality of opening for communication with said outer tube.

11. A packing sheet calender comprising two calender stands spaced from one another, a cooled cylinder of small diameter rotatably supported between said calender stands, a heated cylinder of large diameter disposed between said calender stands with its axis parallel to the axis of said cylinder of small diameter, said large diameter heated cylinder comprising two circular end walls and a hollow cylindrical casing, means rotatably supporting said heated cylinder of large diameter on said calender stands, said supporting means consisting of two stub shafts integral with and projecting axially from said end walls respectively, said stub shafts being rotatably supported by bearings in said calender stands respectively, at least one of said stub shafts being hollow, said casing having therein circumferentially spaced, axially extending passages for the flow of hot water, a tube system extending axially of said heated cylinder and comprising an inner tube and an outer tube surrounding said inner tube to provide a first fluid passageway in said inner tube and a second fluid passageway between said tubes, means for connecting one of said fluid passageways to a supply of hot water and means for connecting the other of said fluid passageways to a hot water exhaust, radially extending channels at a first end of said heated cylinder comprising channels connecting said first fluid passageway with first ones of said axially extending passages in said casing and channels connecting said second fluid passageway with second ones of said axially extending passages in said casing and a plurality of radially extending channels at a second end of said heated cylinder comprising passage connecting said first fluid passageway with said second ones of said axially extending passages in said casing and channels connecting said second fluid passageway with said first ones of said axially extending passages in said casing, to provide flow of hot water through said axially extending passages in said casing, and means for regulating the flow of hot water in said heated cylinder, said means for regulating the flow of hot water in said heated cylinder comprising a sleeve movable axial to close to a variable degree the inner ends of said radially extending channels at one end of said heated cylinder and means for variably positioning said sleeve to vary the degree that said sleeve closes said inner ends of said radially extending channels.

* * * * *